United States Patent
Liu et al.

(10) Patent No.: US 10,725,584 B2
(45) Date of Patent: Jul. 28, 2020

(54) METHOD AND APPARATUS FOR DETERMINING REFERENCE VALUE, AND ELECTRONIC TERMINAL THEREOF

(71) Applicant: SHENZHEN GOODIX TECHNOLOGY CO., LTD., Shenzhen (CN)

(72) Inventors: Songsong Liu, Shenzhen (CN); Wingho Pang, Shenzhen (CN); Haikuan Jiang, Shenzhen (CN); Wei Yang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/147,813

(22) Filed: Sep. 30, 2018

(65) Prior Publication Data

US 2019/0034031 A1    Jan. 31, 2019

Related U.S. Application Data

(63) Continuation of application No. PCT/CN2017/095273, filed on Jul. 31, 2017.

(51) Int. Cl.
*G06F 3/044* (2006.01)
*G06F 3/041* (2006.01)
*H04M 1/02* (2006.01)

(52) U.S. Cl.
CPC .......... *G06F 3/0418* (2013.01); *G06F 3/044* (2013.01); *H04M 1/0202* (2013.01); *H04M 2250/22* (2013.01)

(58) Field of Classification Search
CPC ..... G06F 3/0418; G06F 3/044; H04M 1/0202
See application file for complete search history.

(56) References Cited

U.S. PATENT DOCUMENTS

| | | | |
|---|---|---|---|
| 2010/0103116 A1 | 4/2010 | Leung et al. | |
| 2013/0265278 A1* | 10/2013 | Son .................... | G06F 3/044 345/174 |

(Continued)

FOREIGN PATENT DOCUMENTS

| | | |
|---|---|---|
| CN | 101419522 A | 4/2009 |
| CN | 102566822 A | 7/2012 |

(Continued)

*Primary Examiner* — Towfiq Elahi

(57) ABSTRACT

A method and apparatus for determining a reference value of a touch screen, and an electronic terminal thereof are provided. The method includes: determining a candidate reference value of a touch screen according to an original reference value and a reference fitting relationship of the touch screen, wherein the reference fitting relationship is determined according to the original reference value of the touch screen and a capacitance value of a capacitor node on the touch screen in a first frame; correcting the candidate reference value; and determining a stable reference value of the touch screen according to the corrected candidate reference value. According to embodiments of the present disclosure, the candidate reference value is closer to the actual capacitance reference, such that accuracy of the determined stable reference value is ensured as much as possible.

11 Claims, 4 Drawing Sheets

(56) References Cited

U.S. PATENT DOCUMENTS

2013/0300707 A1\* 11/2013 Hershman ............... G06F 3/044
                                                    345/174
2014/0225874 A1   8/2014 Snedeker
2016/0077625 A1   3/2016 Soo et al.

FOREIGN PATENT DOCUMENTS

| CN | 102855032 | \* | 1/2013 | ............ G06F 3/044 |
| CN | 102855032 A | | 1/2013 | |
| CN | 103235672 A | | 8/2013 | |
| CN | 103914180 A | | 7/2014 | |
| EP | 2518594 A1 | | 10/2012 | |
| WO | 2016164193 A1 | | 10/2016 | |
| WO | 2017041249 A1 | | 3/2017 | |

\* cited by examiner

METHOD AND APPARATUS FOR DETERMINING REFERENCE VALUE, AND ELECTRONIC TERMINAL THEREOF

CROSS-REFERENCE TO RELATED APPLICATIONS

The present disclosure is a continuation of international application No. PCT/CN2017/095273 filed on Jul. 31, 2017, which is hereby incorporated by reference in its entireties.

TECHNICAL FIELD

Embodiments of the present disclosure relate to the field of touch technologies, and in particular, relate to a determining method and apparatus for determining a reference value, and a touch screen and an electronic terminal thereof.

BACKGROUND

With the development of touch control technologies and mobile terminal technologies, more and more mobile terminals achieve man-machine interactions by means of touch control. At present, touch screens employed by the mobile terminals mainly include capacitive touch screens and resistive touch screens, wherein the capacitive touch screens are popular among more and more people with better definition, light transmittance and touch feeling.

A capacitive touch screen is composed of a touch sensor and a touch controller. The touch sensor is composed of a plurality of capacitor nodes. When the touch screen is touched, the capacitance value of a corresponding capacitor node varies. Upon detecting the variation, the touch controller may determine a corresponding touch position. For detection on whether the capacitive touch screen is touched, a capacitance value of all the capacitors on the touch screen when being not touched in a frame needs to be acquired as a reference, that is, a stable reference value. After the stable reference value is determined, a touch state may be judged by comparing the capacitance values of the capacitor nodes at the current time with a reference. Therefore, acquisition of the capacitance value of the capacitor node when the touch screen is not touched as the reference is very important in touch control by using the touch screen.

However, in the practical process of determining the reference of the above capacitor node, due to various causes, for example, variations of environment, the capacitance value of the touch screen varies (for example, an original capacitance value of the capacitor node becomes smaller or becomes greater due to temperature rise or temperature reduction and the like). In this case, a present reference needs to be maintained, to adapt to new conditions. For example, the current reference is re-determined based on the original capacitance value of the capacitor node, or the current capacitance value of the capacitor node is used as the current reference or other adaptation manners or the like are used.

However, no matter which manner is used, the determined capacitance value may still be inaccurate. Therefore, how to determine the reference of the touch screen as accurately as possible is a technical problem to be urgently solved.

SUMMARY

Embodiments of the present disclosure provide a touch screen reference determining method and apparatus, and a touch screen and an electronic terminal thereof, to solve the problem of how to accurately determine a capacitance reference.

According to a first aspect of embodiments of the present disclosure, a touch screen reference determining method is provided. The method includes: determining a candidate reference value of a touch screen according to an original reference value and a reference fitting relationship of the touch screen, wherein the reference fitting relationship is determined according to the original reference value of the touch screen and a capacitance value of a capacitor node on the touch screen in a first frame; correcting the candidate reference value; and determining a stable reference value of the touch screen according to the corrected candidate reference value.

According to a second aspect of embodiments of the present disclosure, a touch screen reference determining apparatus is provided. The apparatus includes: a first determining module, configured to determine a candidate reference value of a touch screen according to an original reference value and a reference fitting relationship of the touch screen, wherein the reference fitting relationship is determined according to the original reference value of the touch screen and a capacitance value of a capacitor node on the touch screen in a first frame; a correcting module, configured to correct the candidate reference value; and a second determining module, configured to determine a stable reference value of the touch screen according to the corrected candidate reference value.

According to a third aspect of embodiments of the present disclosure, a touch screen is further provided. The touch screen includes: a touch controller and a touch sensor, the touch controller being electrically connected to the touch sensor; wherein the touch sensor is configured to acquire a capacitance value of a capacitor node on the touch screen; and the touch controller is configured to acquire the capacitance value acquired by the touch sensor, and perform operations corresponding to a touch screen reference determining method as described in the first aspect according to the acquired capacitance value.

According to a fourth aspect of embodiments of the present disclosure, an electronic terminal is further provided. The electronic terminal includes the touch screen as described in the third aspect.

According to a fifth aspect of embodiments of the present disclosure, a computer readable storage medium is further provided, wherein the computer readable storage medium stores: an computer executable instructions for determining a candidate reference value of a touch screen according to an original reference value and a reference fitting relationship of the touch screen, wherein the reference fitting relationship is determined according to the original reference value of the touch screen and a capacitance value of a capacitor node on the touch screen in a first frame; and a computer executable instruction for correcting the candidate reference value; and a computer executable instruction for determining a stable reference value of the touch screen according to the corrected candidate reference value.

With the touch screen reference determining solutions according to the embodiments of the present disclosure, an original reference value is firstly processed by means of fitting to acquire a candidate reference value of the touch screen. However, the candidate reference value may be not accurate, and thus needs to be further corrected to acquire a final correct and stable reference value of the touch screen. In the manner of acquiring the candidate reference value of the touch screen by means of fitting, when the reference of each capacitor node is determined, not only data of the capacitor node is considered, but also data of the other capacitor nodes is used as a reference, such that the determined candidate reference is more subject and is closer to a current actual capacitance reference. Further, the acquired candidate reference value may be further corrected, to ensure that during the process of acquiring the stable reference value, even if some exceptions occur, for example, a finger touches the touch screen, through correction, the candidate reference value is closer to the actual capacitance reference, such that accuracy of the determined stable reference value is ensured as much as possible.

BRIEF DESCRIPTION OF THE DRAWINGS

To more clearly describe embodiments of the present disclosure or the technical solution in the related art, hereinafter, drawings that are to be referred for description of the embodiments or the related art are briefly described. Apparently, the drawings described hereinafter merely illustrate some embodiments of the present disclosure. Persons of ordinary skill in the art may also derive other drawings based on the drawings described herein without any creative effort.

DETAILED DESCRIPTION

To make the objectives, technical features, and advantages of the present disclosure clearer and more understandable, the technical solutions according to the embodiments of the present disclosure are further described in detail with reference to the accompany drawings. Apparently, the embodiments described herein are merely some exemplary ones, rather than all the embodiments of the present disclosure. Based on the embodiments of the present disclosure, all other embodiments derived by persons of ordinary skill in the art without any creative efforts shall fall within the protection scope of the embodiments of the present disclosure.

Figure 1:
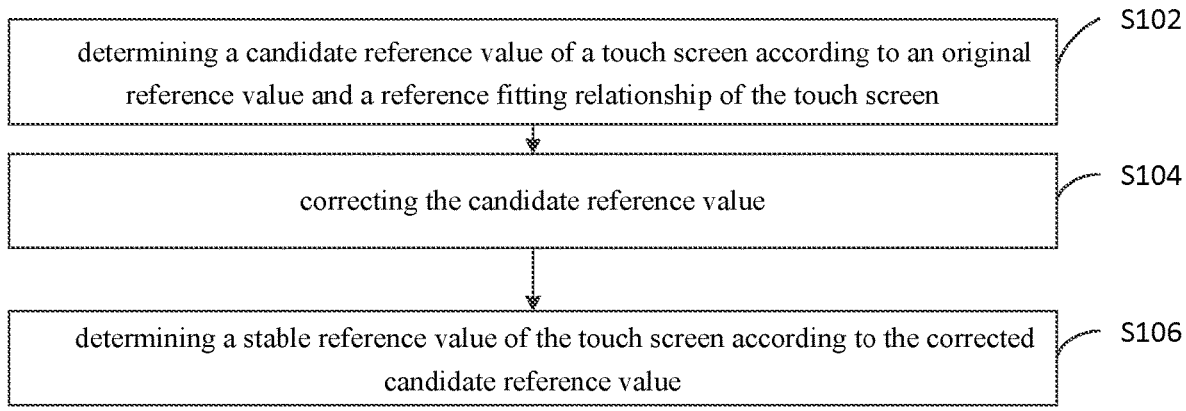
FIG. 1 is a schematic flowchart of steps in a touch screen reference determining method according to the first embodiment of the present disclosure.

FIG. 1 is a schematic flowchart of steps in a touch screen reference determining method according to the first embodiment of the present disclosure.

The touch screen reference determining method according to this embodiment includes the following steps:

Step S102: A candidate reference value of a touch screen is determined according to an original reference value and a reference fitting relationship of the touch screen. Wherein the reference fitting relationship is determined according to the original reference value and a capacitance value of a capacitor node on the touch screen in a first frame.

In the embodiments of the present disclosure, unless otherwise specified, the terms such as "first frame", "second frame", "third frame" . . . "ninth frame" used herein are only intended to differentiate or denote different frames, instead of indicating a specific sequence or referring to a specific frame of the touch screen. In this step, the "first frame" may be appropriately defined by a person skilled in the art according to the actual needs, which includes, but not limited to, a current frame at a current time of the touch screen. A person skilled in the art should acknowledge that the current frame of the touch screen may vary with refresh of the touch screen (screen refresh).

For detection on whether a capacitive touch screen is touched, a capacitance value of all the capacitors on the touch screen when being not touched in a frame needs to be acquired as a reference, that is, a stable reference value. After the stable reference value is determined, a touch state may be judged by comparing the capacitance values of the capacitor nodes at the current time with the corresponding stable reference value. In the embodiment of the present disclosure, the process between the time when the touch screen is powered on and the time the stable reference value is acquired is the process of determining the stable reference value. Determination of the stable reference value may be practiced according to the embodiment of the present disclosure.

Generally, if the capacitance value in a frame may be determined as the stable reference value, the operation for determining the stable reference value may be terminated.

The original reference value may be a sampling value acquired by sampling a capacitor node in a frame when the touch screen is not touched, which is also referred to as a backup reference. For example, when the touch screen is set to an output device or a smart terminal, during delivery from factory, the sampling node is sampled, and the acquired sampling value is used as the backup reference value. Based on the original reference value and the capacitance value of the capacitor node on the touch screen in a frame, for example, the current frame, by using any suitable fitting processing, including but not limited to linear fitting, non-linear fitting and the like, a result (that is, the candidate reference value) acquired after the original reference fitting approaches the capacitance value of the capacitor node in the current frame. A smaller fitting error between the fitting result and the capacitance value in the current frame indicates a better fitting effect. Therefore, a fitting relationship with a minimum fitting error among a plurality of fitting relationships may be used to fitting the original fitting reference to acquire the candidate reference value.

Step S104: The candidate reference value is corrected. Wherein to ensure that during the process of acquiring the stable reference value, even if some exceptions occur, for example, a finger touches the touch screen, through correction, a relatively correct stable reference value may still be acquired, the candidate reference value may be further corrected, such that the candidate reference value approaches an actual reference to ensure that accuracy of the determined stable reference value as much as possible.

The correction of the candidate reference value is mainly directed to an abnormal capacitor node, for example, a capacitor node that is touched. The correct manners include, but not limited to, re-determining a fitting coefficient and perform fitting again for the abnormal capacitor node, removing the abnormal capacitor node and fitting the other capacitor nodes on the touch screen again, and the like.

By correcting the candidate reference value, a finally determined stable reference value is closer to an actual capacitance reference.

Step S106: A stable reference value of the touch screen is determined according to the corrected candidate reference value.

For example, the corrected candidate reference value may be directly determined as the stable reference value of the touch screen, or the corrected candidate reference value may be further processed, for example, a further correction or multiple corrections or the like, and then a final result is determined as the stable reference value of the touch screen. The stable reference value is a judgment basis for touch detection.

It should be noted that the embodiment of the present disclosure may be applicable to various scenarios where the stable reference value of the touch screen needs to be determined, including, but not limited to: a scenario of determining the stable reference value after the touch screen hops (the frequency of sending a driving signal of the touch screen is changed) due to noise interference, a scenario of determining the stable reference value after the touch screen is powered on, and other scenarios where the stable reference value needs to be determined and the like, in particular, a scenario of determining the stable reference value when the touch screen is touched by a finger.

According to this embodiment, an original reference value is firstly processed by means of fitting to acquire a candidate reference value of the touch screen. However, the candidate reference value may be not accurate, and thus needs to be further corrected to acquire a final correct and stable reference value of the touch screen. In the manner of acquiring the candidate reference value of the touch screen by means of fitting, when the reference of each capacitor node is determined, not only data of the capacitor node is considered, but also data of the other capacitor nodes is used as a reference, such that the determined candidate reference is more subject and is more close to a current actual capacitance reference. Further, the acquired candidate reference value may be further corrected, to ensure that during the process of acquiring the stable reference value, even if some exceptions occur, for example, a finger touches the touch screen, through correction, the candidate reference value is more close to the actual capacitance reference, such that accuracy of the determined stable reference value is ensured as much as possible.

The touch screen reference determining method according to this embodiment may be practiced by any suitable apparatus or device having a data processing function, including, but not limited to, a touch controller.

Figure 2:
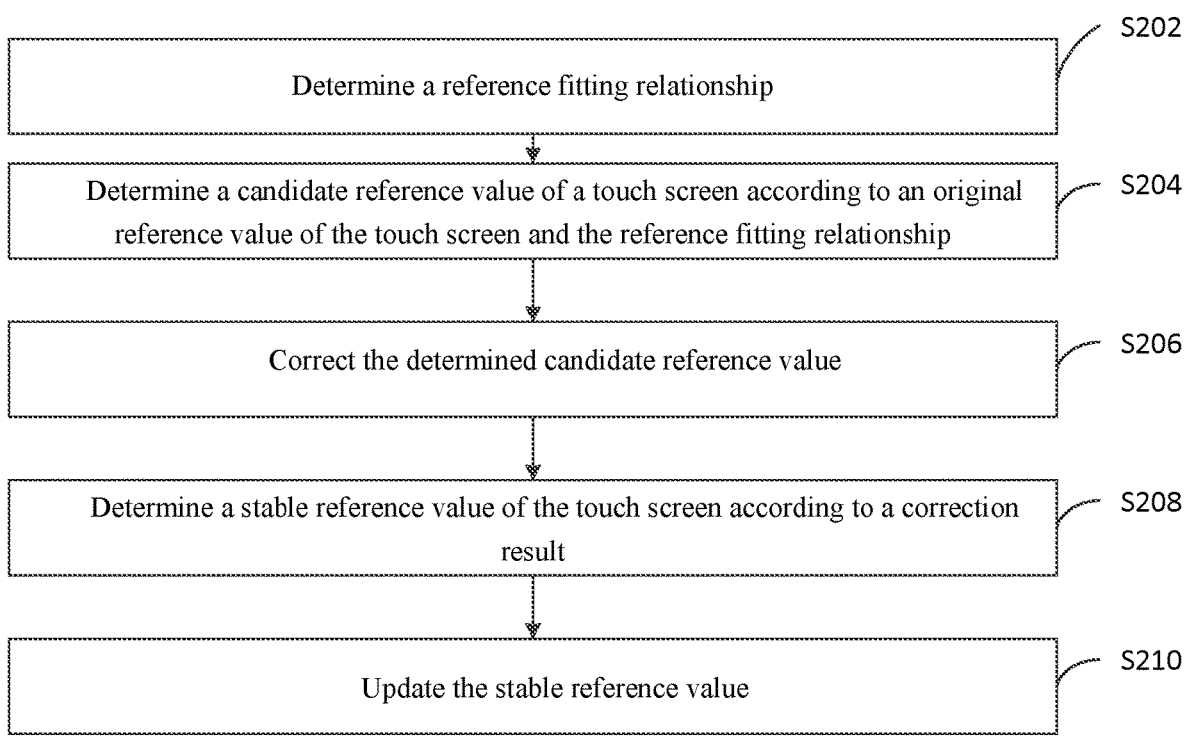
FIG. 2 is a schematic flowchart of steps in a touch screen reference determining method according to the second embodiment of the present disclosure.

FIG. 2 is a schematic flowchart of steps in a touch screen reference determining method according to the second embodiment of the present disclosure.

The touch screen reference determining method according to this embodiment includes the following steps:

Step S202: A reference fitting relationship is determined.

In the embodiment of the present disclosure, a stable reference value of a touch screen needs to be determined according to an original reference value and a reference fitting relationship. The reference fitting relationship may be determined according to the original reference value of the touch screen and a capacitance value of a capacitor node on the touch screen. The "first frame" is determined by a person skilled in the art according to the actual needs, including, but not limited to, a current frame of the touch screen. In this embodiment, the first frame is defined to be the current frame of the touch screen.

In a possible implementation, a plurality of (in the embodiment of the present disclosure, "a plurality of", "various" and the like quantity-indicative words refer to a number of two or more than two) different fitting relationships, and then the original reference value of the touch screen and a capacitance value of the capacitor node on the touch screen in a fifth frame are fitted by using the plurality of different fitting relationships to acquire a plurality of corresponding fitting results. Afterwards, a fitting result with a minimum error is selected from the plurality of fitting results. Finally, the fitting relationship corresponding to the fitting result with the minimum error is determined as the reference fitting relationship for acquiring a candidate reference value. The fifth frame is appropriately defined by a person skilled in the art according to the actual needs. In addition, in practice, a person skilled in the art may randomly select a plurality of suitable fitting relationships for comparison to acquire an optimal result. By using the plurality of different fitting relationships, determination of the reference fitting relationship is more subjective, such that it is ensured that during the subsequent process, the stable reference value may be relatively accurately determined.

For example, it is defined that the reference fitting relationship to be used is determined by using the least square method, the polynomial regression method and the secant method based on the original reference value and the capacitance value of the capacitor node on the touch screen in the fifth frame. Assume that the fitting coefficients acquired by calculation are respectively: fitting coefficients M1 and B1 corresponding to the least square method, fitting coefficients M2 and B2 corresponding to the polynomial regression method, and fitting coefficients M3 and B3 corresponding to the secant method. If M1 and B1 are used, the original reference value is fitted based on the least square method to acquire a fitting result R1, wherein an error between R1 and a capacitance value of the capacitor node in the current frame is ERROR 1; if M2 and B2 are used, the original reference value is fitted based on the polynomial regression method to acquire a fitting result R2, wherein an error between R2 and the capacitance value of the capacitor node in the current frame is ERROR 2; and if M3 and B3 are used, the original reference value is fitted based on the secant method to acquire a fitting result R3, wherein an error between R3 and the capacitance value of the capacitor node in the current frame is ERROR 3. If in ERROR 1, ERROR 2 and ERROR 3, the value of ERROR 1 is the minimum, the least square method corresponding to ERROR 1 may be determined as the reference fitting relationship for acquiring the candidate reference value. If a channel, for example, a driving channel, is used as a unit, through fitting, the acquired ERROR may be the maximum value of the errors corresponding to all the channels. The fitting coefficients M and B are only for illustration purpose, instead of denoting any specific coefficient in the fitting relationship. Using the least square method as an example, M1 may represent a slope coefficient or may represent a secant coefficient therein. When M1 represents a slope coefficient, B1 represents a secant coefficient; and when M1 represents a secant coefficient, B1 represents a slope coefficient. In the other fitting relationships, the fitting coefficients are similar, which are thus not described herein any further.

It should be noted that in specific fitting, fitting may be performed by using a driving channel of the touch screen as a unit, or may be performed by using a sensing channel of the touch screen as a unit. In this case, although the same fitting relationship is used, for example, the least square method, the fitting coefficients corresponding to various channels may be different from each other. For example, if fitting is performed by using the driving channel as a unit, assume that driving channels TX1, TX2 and TX3 are used, based on an original reference value of a capacitor node on TX1 and a capacitance value thereof in the current frame, fitting coefficients MTX1 and BTX1 on TX1 are acquired by using the least square method; based on an original reference value of a capacitor node on TX2 and a capacitance value thereof in the current frame, fitting coefficients MTX2 and BTX2 on TX2 are acquired by using the least square method; and based on an original reference value of a capacitor node on TX3 and a capacitance value thereof in the current frame, fitting coefficients MTX3 and BTX3 are acquired by using the least square method. In this case, with respect to the above acquired result, if the result is R1, R1 is a result of a TX channel among results of a plurality of TX channels, and ERROR 1 corresponding to the result may be a maximum error among the errors of the plurality of TX channels.

Step S204: A candidate reference value of the touch screen is determined according to an original reference value of the touch screen and the reference fitting relationship.

After a reference fitting relationship is determined, the original reference value may be fitted by using the reference fitting relationship to acquire a candidate reference value of the touch screen.

It should be noted that when the touch screen hops, if the hopping of the touch screen is caused by preventing noise, after it is determined that a driving signal sending frequency of the touch screen has changed (that is, hopping), the candidate reference value of the touch screen may be determined according to the original reference value of the touch screen and the reference fitting relationship. That is, a precondition for performing the step of determining a candidate reference value of a touch screen according to an original reference value and a reference fitting relationship of the touch screen is: it is identified that a frequency of a driving signal of the touch screen has changed. For example, a process of determining the stable reference value when the touch screen is touched by a finger after touch screen hops.

Step S206: The determined candidate reference value is corrected.

In another possible implementation, a capacitor node with an abnormal reference value may be firstly determined according to a difference between the candidate reference value and the original reference value; and a candidate reference value of the capacitor node with the abnormal reference value is corrected. For example, if the difference between the candidate reference value and the original reference value is greater than a touch threshold for judging whether a capacitor node on the touch screen is touched, a capacitor node corresponding to the difference is determined as the capacitor node with the abnormal reference value.

In this manner, when the candidate reference value of the capacitor node with the abnormal reference value is corrected, one possible manner includes: determining a capacitor node that is adjacent to the capacitor node with the abnormal reference value; and correcting the candidate reference value of the capacitor node with the abnormal reference value according to a corresponding original reference value of the capacitor node with the abnormal reference value, a fitting coefficient of the adjacent capacitor nodes and the reference fitting relationship. Generally, the capacitor node with the abnormal reference value may be a capacitor node that is touched during the process of determining the stable reference value. The fitting coefficients of such capacitor nodes may be the same or similar to those of the adjacent capacitor nodes thereof, for example, capacitor nodes on the adjacent channels. Therefore, the candidate reference value of the capacitor node with the abnormal reference value may be calculated by using the fitting coefficients of the adjacent capacitor nodes, such that the error thereof may be corrected.

Optionally, the fitting coefficient of the adjacent capacitor node may be determined by: determining a capacitor nodes with a minimum difference between the candidate reference and a capacitance in a second frame from a plurality of adjacent capacitor nodes of the capacitor nodes with the abnormal reference value; and determining a fitting coefficient of the capacitor node with the minimum difference as the fitting coefficient for correcting the candidate reference value corresponding to the capacitor node with the abnormal reference value. For example, the original reference value corresponding to the capacitor node with the abnormal reference value is fitted by using the least square method based on the fitting coefficient. As such, a result acquired by this fitting may be determined as the stable reference value of the capacitor node. A "second frame" may be appropriately defined by a person skilled in the art according to the actual needs. Optionally, the second frame may be a current frame of the touch screen. The second frame may be the same as or different from the first frame.

In another possible implementation of correcting the candidate reference value of the capacitor node with the abnormal reference value, a value corresponding to the capacitor node with the abnormal reference value may be removed from the original reference value of the touch screen to acquirea corrected original value; a capacitance value corresponding to the capacitor node with the abnormal reference value may be removed from a capacitance value of the capacitor node on the touch screen in a third frame to acquire a corrected capacitance value; a fitting coefficient in the reference fitting relationship is updated according to the corrected original value and the corrected capacitance value; and the candidate reference value is corrected according to the updated fitting coefficient and the original reference value. In this manner, accuracy of the fitting coefficient is ensured as much as possible by removing the abnormal data, and impacts caused by error data to the determination of the stable reference value are prevented. The "third frame" may be selected or defined by a person skilled in the art according to the actual needs, including, but not limited to, a current frame of the touch screen. The third frame may be the same as or different from the first frame.

Optionally, when the candidate reference value is corrected according to the updated fitting coefficient and original reference value, the candidate reference value may be corrected according to the original reference value, the reference fitting relationship and the updated fitting coefficient.

For example, it is defined that the capacitors with the abnormal reference values are P1, P2 and P3, the corresponding original reference values are respectively O1, O2 and O3, and the original fitting coefficients determined by using the least square method are MO and BO; the capacitance values of P1, P2 and P3 in the current frame are respectively C1, C2 and C3, and in this case, after it is determined that P1, P2 and P3 are capacitor nodes with the abnormal reference values, O1, O2 and O3 are subtracted removed from the original reference value (marked as O) corresponding to all the capacitors on the touch screen to acquire a corrected original value (marked as OR); C1, C2 and C3 are subtracted removed from the capacitance value (marked as C) of all the capacitor nodes on the touch screen in the current frame to acquire a corrected capacitance value (marked as CR); new fitting coefficients MR and BR are determined by using the least square method based on OR and CR (CR may be fitted by using OR, and in this manner, OR is an argument and CR is a variable); and then the value in O is fitted by using the least square method based on MR and BR such that an acquired new fitting result may be determined as the stable reference value.

In still another possible manner, during correcting the candidate reference value, a difference between the candidate reference value of the capacitor on the touch screen and a capacitance value thereof in a fourth frame may be acquired; and the candidate reference value may be corrected according to the difference value and the reference fitting relationship. The "fourth frame" may be appropriately defined by a person skilled in the art according to the actual needs, including, but not limited to, a current frame of the touch screen. The fourth frame may be the same as or different from the first frame.

In the above possible implementation of correcting the candidate reference value according to the difference and the reference fitting relationship, the difference may be fitted according to the reference fitting relationship to acquire a difference fitting result; and the candidate reference value is corrected according to a difference between the candidate reference value and the difference fitting result. In this manner, it is unnecessary to judge whether there is a capacitor node with an abnormal reference value, and the difference is fitted to reduce the impacts caused by the capacitor node with the abnormal reference value to the stable reference value, such that the stable reference value approaches the actual capacitor reference as much as possible.

Optionally, during acquisition of the difference fitting result by fitting the difference based on the reference fitting relationship, the difference fitting result may be acquired by fitting the difference by using a driving channel of the touch screen as a unit or using a sensing channel of the touch screen as a unit based on the reference fitting relationship.

Step S208: A stable reference value of the touch screen is determined according to the corrected candidate reference value.

A result acquired after the candidate reference value is corrected may be used as the stable reference value of the touch screen.

Nevertheless, the result acquired after the correction may also be used as a reference, the result may be re-corrected or repeatedly corrected with reference to the plurality of possible manners in step S206, until a predetermined correction condition is satisfied, for example, a predetermined correction count or the like.

Step S210: The stable reference value is updated.

The determined stable reference value is updated during the subsequent use, to ensure that during the subsequent use, the stable reference value better approaches an actual capacitance reference of the touch screen at a time point.

For example, a capacitor node with a difference between the stable reference value and a capacitance value in a sixth frame being less than a predetermined threshold on the touch screen may be identified; a reference update region may be determined according to the identified capacitor node; and a stable reference value for the capacitor in the reference update region may be updated. The predetermined threshold may be appropriately defined by a person skilled in the art according to the actual needs, for example, the predetermined threshold may be defined as a touch threshold of the touch screen; and the sixth frame may also be selected and defined by a person skilled in the art according to the actual needs, which is not limited in the embodiment of the present disclosure. Optionally, the sixth frame may be a current frame of the touch screen at the current time.

In one optional solution, during update of a stable reference value for the capacitor node in the reference update region, the stable reference value may be updated according to a capacitance value of the capacitor node in the reference update region in a current frame. If a difference between the stable reference value of the capacitor node and a capacitance value thereof in a sixth frame is less than a predetermined threshold or a touch threshold, the stable reference value is slightly different from the actual capacitance reference value. In this case, the stable reference value is further updated. For example, the stable reference value is replaced by the capacitance value in the current frame, and since the capacitance value in the current frame is closer to the actual capacitance reference of the touch screen relative to the stable reference value acquired by means of fitting, the update ensures that the stable reference value is more accurate.

Nevertheless, in addition to the above updating manner, in another optional solution, a capacitor node on the touch screen with a capacitance value that is continuously greater than or equal to a touch threshold during a period of time that is longer than a first predetermined time threshold may also be identified; or it is identified that capacitance values of all capacitor nodes on the touch screen are continuously less than the touch threshold during a period of time that is longer than a second predetermined time threshold; and the stable reference value is updated according to capacitance values of the capacitor node on the touch screen in a seventh frame and an eighth frame. The first predetermined time threshold and the second predetermined threshold may be both appropriately defined by a person skilled in the art according to the actual needs, which is not limited in the embodiment of the present disclosure. The seventh frame and the eighth frame may be defined by a person skilled in the art according to the actual needs. Optionally, the eighth frame is the current frame of the touch screen, the seventh frame is a frame prior to the eighth frame, and the eighth frame and the seventh frame may be two adjacent frames or may be two frames that are spaced apart but are still adjacent. For example, upon determination of the stable reference value, the fourth frame is the eighth frame, the seventh frame may be the third frame or may be the second frame or the first frame. Generally, the eighth frame is the current frame of the touch screen, and the capacitance value in this frame may be acquired in real time, whereas the capacitance value in the seventh frame may be data acquired and stored prior to the eighth frame.

In this manner, when some capacitor nodes on the touch screen are continuously touched, or the touch screen is not touched for a period of time, the stable reference value may be updated. The update may be practiced by: acquiring a difference between the capacitance values of the capacitor node on the touch screen in the seventh frame and the eighth frame, calculating a product of a defined update coefficient and the difference by using a defined update coefficient, and updating the stable reference value according to a sum of the product and the capacitance value in the seventh frame. The update coefficient may be appropriately defined by a person skilled in the art according to the actual needs, for example, any value within the range of 0.02 to 0.1, which is not limited in the embodiment of the present disclosure. By correcting the capacitance value by using the difference, the capacitance value gradually approaches the current actual reference of the touch screen; and by the update coefficient, the degree of impacts caused by the difference to the capacitance reference may be defined, to define the degree and speed of approaching the actual capacitance reference.

Through the above process, the stable reference value more precisely approaches the actual capacitance reference.

It should be noted that this step is an optional step. In practice, even if the stable reference value is not updated, a relatively accurate touch control may still be practiced based on the determined stable reference value upon power-on.

In addition, since during long-term use, the touch screen may be subject to aging of the capacitor material and the like, and the aging may cause variations of the original reference of the capacitor node, to adapt to such variations, the original reference value needs to be learned again, updated and backed up.

In an possible implementation, the original reference value may be learned any or updated at any suitable opportunity after the stable reference value of the touch screen is determined, which includes: acquiring a capacitance value and a fitting reference value of the capacitor node on the touch screen in a ninth frame at a predetermined driving signal frequency; and updating the original reference value according to the acquired capacitance value and fitting reference value in the ninth frame. The predetermined frequency for sending the driving signal is the frequency when the original reference value is generated, and the fitting reference value is acquired according to the reference fitting relationship and the original reference value. Optionally, the ninth frame may be a current frame of the touch screen at the current time.

Optionally, when the original reference value is updated according to the acquired capacitance value in the ninth frame and the fitting reference value, the original reference value may be updated based on a difference between the capacitance value in the ninth frame and the fitting reference value and according to a product of a predetermined weight and the acquired difference. The predetermined weight may be appropriately defined by a person skilled in the art according to the actual needs, which is not limited in the embodiment of the present disclosure. The greater the weight, the greater the impacts caused by the capacitance value in the ninth frame to the update.

For example, the original reference value is a reference value acquired when the touch screen works at a frequency of 200 KHz, and in this case, during re-learning and update of the original reference value, the touch screen also needs to work at the frequency of 200 KHz. Hence, the previous backup original reference value is fitted by using the determined reference fitting relationship (once determined, the reference fitting relationship may not be changed) to acquire a fitting result, that is, a fitting reference value; a capacitance value of the capacitor node on the touch screen in a current frame at the frequency of 200 KHz is acquired; a difference between the capacitance value in the current frame and the fitting reference value is acquired; a product of the difference and a predetermined weight is calculated; and a sum of the product and the previous backup original reference value is used as an updated new original reference value.

In addition, since in the practical testing, it is found that difference temperatures may exert some impacts on the frequency response, learning of the original reference value needs to be carried out at temperatures in the vicinity of the temperature for determining the original reference value. Accordingly, whether a difference of an average value of the capacitance values in the ninth frame and an average value of the original reference values is less than a predetermined average difference threshold; and the step of acquiring noise of the touch screen at a predetermined driving signal frequency is performed if the difference is less than the predetermined average difference threshold. The predetermined average difference threshold may be appropriately defined by a person skilled in the art according to the actual needs, which is not limited in the embodiment of the present disclosure. If the difference of the average value of the capacitance values in the ninth frame and the average value of the original reference values is less than the predetermined average difference threshold, it may be considered that the touch screen is currently working at the temperature which is substantially the same as the temperature for sampling the original reference value, such that the re-learnt and updated original reference value is more accurate.

In addition, noise may also exert impacts on the re-learning and update of the original reference value. If the noise is over-great, it is inappropriate to carry out learning and update. Accordingly, noise data of the touch screen at the predetermined driving signal frequency may be firstly acquired; whether the noise data is less than a predetermined noise threshold is judged; and the step of acquiring a capacitance value and a fitting reference value of the capacitor node on the touch screen in a ninth frame at the predetermined driving signal frequency is performed if the noise data is less than a predetermined noise threshold. The predetermined noise threshold may be appropriately defined by a person skilled in the art according to the actual needs, to ensure that the noise exerts as few as possible impacts on the determination of the capacitance reference. The predetermined noise threshold is not limited in the embodiment of the present disclosure.

Optionally, before the original reference value is updated according to the acquired capacitance value in the ninth frame and the fitting reference value, whether a difference of a capacitance value in the ninth frame and a fitting reference value is greater than a predetermined difference threshold; and the step of updating the original reference value according to the acquired capacitance value in the ninth frame and fitting reference value if the difference is greater than the predetermined average difference threshold. If the difference of the capacitance value in the ninth frame and the fitting reference value is not greater than the predetermined difference threshold, the previous backup original reference value is still relatively correct, and temporarily does not need to be re-learned or updated. The predetermined difference threshold may be appropriately defined by a person skilled in the art according to the actual needs, which is not limited in the embodiment of the present disclosure.

According to this embodiment, in one aspect, the determined stable reference value is more accurate, and closer to the current actual capacitance reference of the touch screen; in another aspect, update of the stable reference value after the stable reference value is determined ensures accuracy of the stable reference during subsequent use; and in still another aspect, re-learning and update of the original reference value effectively addresses the problem that the stable reference value determined based on the original reference value is incorrect due to such factors as aging of the touch screen and the like.

The touch screen reference determining method according to this embodiment may be practiced by any suitable apparatus or device having a data processing function, including, but not limited to, a touch controller.

Figure 3:
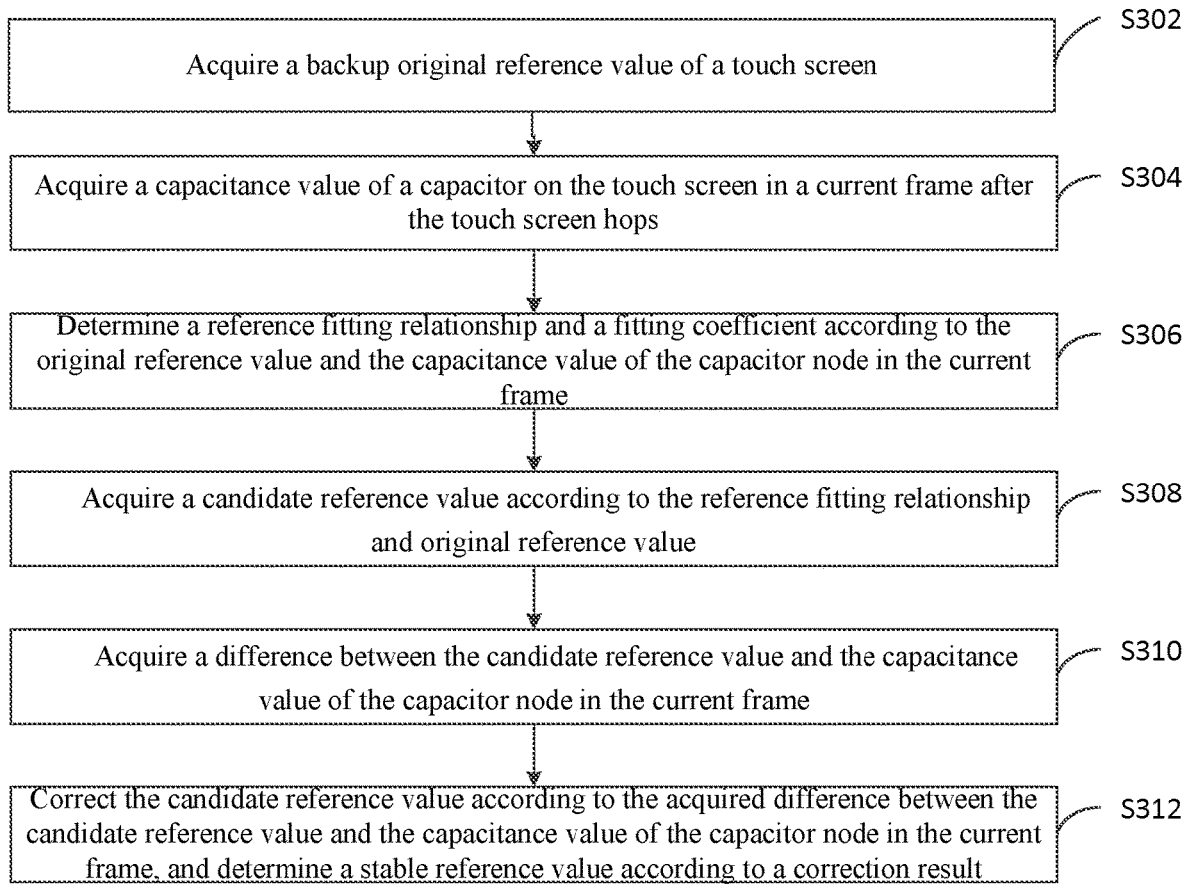
FIG. 3 is a schematic flowchart of steps in a touch screen reference determining method according to the third embodiment of the present disclosure.

FIG. 3 is a schematic flowchart of steps in a touch screen reference determining method according to the third embodiment of the present disclosure.

In this embodiment, the touch screen reference determining method is described by using specific example of determining a stable reference value after the touch screen hops as an example. However, a person skilled in the art should acknowledge that other suitable application scenarios may also be referenced to the determination of the stable reference value of the touch screen according to this embodiment.

The touch screen reference determining method according to this embodiment includes the following steps:

Step S302: A backup original reference value of a touch screen is acquired.

In this embodiment, when the touch screen is in a stable state (in which the touch screen is not touched, or not pressed by a foreign object), a capacitance value acquired at a working frequency is used as a reference value, and this reference value is stored in a non-volatile storage medium (for example, a FLASH or an EEPROM, wherein in this embodiment, description is given by using the FLASH as an example) as an original reference value (that is, a backup reference), and a frequency of this original reference value is recorded.

In this embodiment, the backup original reference values are as listed in Table 1. The first row lists serial numbers of the driving electrodes on the touch screen, and the first column lists serial numbers of the sensing electrodes on the touch screen.

TABLE 1

| Serial number | TX1 | TX2 | TX3 | TX4 | TX5 | TX6 | TX7 | TX8 |
|---|---|---|---|---|---|---|---|---|
| RX1 | 2782 | 2787 | 2782 | 2785 | 2784 | 2783 | 2789 | 2782 |
| RX2 | 2786 | 2778 | 2783 | 2789 | 2787 | 2790 | 2794 | 2798 |
| RX3 | 2788 | 2783 | 2786 | 2781 | 2782 | 2782 | 2785 | 2780 |
| RX4 | 2792 | 2788 | 2792 | 2791 | 2796 | 2798 | 2803 | 2803 |
| RX5 | 2775 | 2770 | 2777 | 2779 | 2781 | 2782 | 2790 | 2789 |
| RX6 | 2797 | 2793 | 2708 | 2704 | 2704 | 2705 | 2709 | 2709 |

Step S304: A capacitance value a capacitor node on the touch screen in a current frame is acquired after the touch screen hops.

In this embodiment, during normal use of the touch screen, a touch controller may acquire capacitance data of the touch screen at a current working frequency, and hence determine a stable reference value based on the backup original reference value and the acquired capacitance value, such that a touch operation on the touch screen is subsequently judged and controlled. When the touch screen is touched, a capacitance value of a touched capacitor node may become smaller. The capacitor node that is touched is determined according to a difference between the capacitance value of the capacitor node on the touch screen and the corresponding stable reference. Accuracy of the difference data is directly reflected by accuracy in calculation of touch coordinates.

However, during use of the touch screen, noise is inevitable, for example, ambient noise, common-mode noise, electromagnetic noise and the like. When the noise is present, the determined stable reference value may be inaccurate due to the presence of the noise data, which is reflected by the difference between the capacitance value of the capacitor node and the corresponding stable reference value. In other words, the difference may become greater or smaller, and as a result, it is misinterpreted that the touch coordinates are calculated because a touch operation is performed, or an actual touch operation makes no response.

Accordingly, when the noise is present, touch screen hopping is generally employed, and the noise interference is prevented by changing a frequency of sending a driving signal by the driving electrode on the touch screen. However, since the stable reference value varies at different frequencies, corresponding stable reference values need to be respectively defined at different frequencies.

In this embodiment, after the touch screen hops, with respect to re-determination of the stable reference value, the stable reference value may be re-defined by acquiring a capacitance value of the capacitor node in a frame upon hopping and by fitting the acquired capacitance value based on the backup original reference value. The details are given in steps hereinafter.

In this embodiment, examples of the capacitance values of the capacitor node after the touch screen hops are as listed in Table 2.

TABLE 2

| Serial number | TX1 | TX2 | TX3 | TX4 | TX5 | TX6 | TX7 | TX8 |
|---|---|---|---|---|---|---|---|---|
| RX1 | 2480 | 2401 | 2527 | 2530 | 2583 | 2528 | 2568 | 2564 |
| RX2 | 2530 | 2490 | 2547 | 2531 | 2582 | 2530 | 2572 | 2578 |
| RX3 | 2567 | 2560 | 2559 | 2529 | 2583 | 2528 | 2565 | 2562 |
| RX4 | 2573 | 2562 | 2563 | 2531 | 2579 | 2533 | 2599 | 2583 |
| RX5 | 2547 | 2555 | 2554 | 2528 | 2584 | 2528 | 2569 | 2570 |
| RX6 | 2581 | 2563 | 2508 | 2511 | 2507 | 2504 | 2503 | 2597 |

Step S306: A reference fitting relationship and a fitting coefficient are determined according to the original reference value and the capacitance value of the capacitor node in the current frame.

In this embodiment, using an original reference value in Table 1 as an argument x and using a capacitance value acquired upon hopping as a variable y, x is fitted to y by using a linear function model or a non-linear function model to acquire fitting coefficients M and B of the function model.

For example, assume that the function model is:

$$y=M*x+B+\text{ERROR}$$

M and B are fitting coefficients, and the fitting is to find optimal M and B such that ERROR is minimized.

If the touch screen hops when being touched, in the related art, a capacitance value in the current frame upon hopping is directly used as the stable reference value. In this case, the capacitance value corresponding to the touch operation is included in the stable reference value. That is, before hopping, data of the touch operation is still present, and the data is not present upon hopping. Accordingly, in the related art, the capacitance value corresponding to the touch operation upon hopping is directly used as the stable reference value, and as a result, the stable reference value is incorrect. However, in this embodiment, as illustrated in the above formula, after a fitting function is used, y may be represented x by using the fitting function. The fitting function enables ERROR in the above formula to be as smaller as possible. In this way, the incorrect stable reference value caused in the prior art is prevented, and the result of M*x+B is as close as possible to y.

The fitting may be performed by using the driving channel as a unit or by using the sensing channel as a unit. Nevertheless, other suitable fitting manners also apply. The fitting manner is not limited in the embodiment of the present disclosure, as long as in the employed fitting manner, the fitting error ERROR is as small as possible. For example, the original value in TX direction in Table 1 is fitted to the TX capacitance value in Table 1 by using the driving channel as a unit based on a least square fitting function, and fitting coefficients M and B are acquired. Fitting coefficients of the TX channels are as listed in Table 3.

Step S312: The candidate reference value is corrected according to the difference between the candidate reference value and the capacitance value of the capacitor node on the touch screen in the current frame, and a stable reference value is determined according to a correction result.

TABLE 3

| Fitting coefficient | TX1 | TX2 | TX3 | TX4 | TX5 | TX6 | TX7 | TX8 |
|---|---|---|---|---|---|---|---|---|
| M | 2.846501 | −0.42658 | 0.567945 | 0.232433 | 0.885784 | 0.309806 | 0.894268 | −0.23287 |
| B | −5385.92 | 3709.078 | 969.0339 | 1882.479 | 113.9785 | 1665.972 | 78.09084 | 3222.315 |

Step S308: A candidate reference value is acquired according to the reference fitting relationship and the original reference value.

After the reference fitting relationship is determined, the fitting coefficients are multiplied by the corresponding argument augment x to acquire a final fitting result.

For example, the original reference values in the TX direction are respectively multiplied by corresponding M in Table 3 and then B is added thereto to acquire final fitting results, as listed in Table 4. The fitting results may be used as candidate reference values upon hopping.

Since the fitting may be subject to some errors, which are greater especially at the touched positions, the candidate reference value acquired by fitting needs to be appropriately corrected according to the difference acquired upon fitting.

In one possible implementation, a capacitor node that is touched may be positioned and the channel thereof may be determined according to the difference acquired upon fitting. Using fitting by using the driving channel as a unit, the driving channel on which the capacitor node that is touched is located may be positioned, and then the fitting coefficient of the capacitor node that is touched is replaced by the fitting coefficient on an adjacent fitting channel, and the fitting coefficient upon replacement are as listed in Table 6. In Table 6, the fitting coefficient of the channel TX2 where the capacitor node that is touched is located is replaced by the fitting coefficient of the channel TX3. The difference acquired upon fitting may be compared with a touch threshold to position the capacitor node that is touched.

TABLE 4

| Serial number | TX1 | TX2 | TX3 | TX4 | TX5 | TX6 | TX7 | TX8 |
|---|---|---|---|---|---|---|---|---|
| RX1 | 2533 | 2520 | 2549 | 2529 | 2580 | 2528 | 2572 | 2574 |
| RX2 | 2544 | 2524 | 2549 | 2530 | 2582 | 2530 | 2576 | 2570 |
| RX3 | 2550 | 2521 | 2551 | 2528 | 2578 | 2527 | 2568 | 2574 |
| RX4 | 2561 | 2519 | 2554 | 2531 | 2590 | 2532 | 2584 | 2569 |
| RX5 | 2513 | 2527 | 2546 | 2528 | 2577 | 2527 | 2573 | 2572 |
| RX6 | 2575 | 2517 | 2507 | 2510 | 2509 | 2503 | 2500 | 2591 |

Step S310: A difference between the candidate reference value and the capacitance value of the capacitor node on the touch screen in the current frame is acquired.

TABLE 6

| Fitting coefficient | TX1 | TX2 | TX3 | TX4 | TX5 | TX6 | TX7 | TX8 |
|---|---|---|---|---|---|---|---|---|
| M | 2.846501 | 0.567945 | 0.567945 | 0.232433 | 0.885784 | 0.309806 | 0.894268 | −0.23287 |
| B | −5385.92 | 969.0339 | 969.0339 | 1882.479 | 113.9785 | 1665.972 | 78.09084 | 3222.315 |

After the fitting result is acquired, the capacitance value of the capacitor node on the touch screen in the current frame is subtracted from the candidate reference value (the values in Table 2 are subtracted form the value in Table 4) to acquire a difference. Difference data is as listed in Table 5.

Afterwards, the original reference value is fitted again by using the updated fitting coefficient to acquire a fitting result. Then, a difference between the fitting result and the capacitance value of the capacitor on the touch screen in the current frame is calculated again (the values in Table 2 are subtracted from the value in Table 7).

The fitting results acquired after the fitting coefficients are updated are as listed in Table 7, and the differences acquired again are as listed in Table 8.

TABLE 5

| Serial number | TX1 | TX2 | TX3 | TX4 | TX5 | TX6 | TX7 | TX8 |
|---|---|---|---|---|---|---|---|---|
| RX1 | 53 | 119 | 22 | −1 | −3 | 0 | 4 | 10 |
| RX2 | 14 | 34 | 2 | −1 | 0 | 0 | 4 | −8 |
| RX3 | −17 | −39 | −8 | −1 | −5 | −1 | 3 | 12 |
| RX4 | −12 | −43 | −9 | 0 | 11 | −1 | −15 | −14 |
| RX5 | −34 | −28 | −8 | 0 | −7 | −1 | 4 | 2 |
| RX6 | −6 | −46 | −1 | −1 | 2 | −1 | −3 | −6 |

TABLE 7

| Serial number | TX1 | TX2 | TX3 | TX4 | TX5 | TX6 | TX7 | TX8 |
|---|---|---|---|---|---|---|---|---|
| RX1 | 2533 | 2551 | 2549 | 2529 | 2580 | 2528 | 2572 | 2574 |
| RX2 | 2544 | 2546 | 2549 | 2530 | 2582 | 2530 | 2576 | 2570 |
| RX3 | 2550 | 2549 | 2551 | 2528 | 2578 | 2527 | 2568 | 2574 |
| RX4 | 2561 | 2552 | 2554 | 2531 | 2590 | 2532 | 2584 | 2569 |
| RX5 | 2513 | 2542 | 2546 | 2528 | 2577 | 2527 | 2573 | 2572 |
| RX6 | 2575 | 2555 | 2507 | 2510 | 2509 | 2503 | 2500 | 2591 |

TABLE 8

| Serial number | TX1 | TX2 | TX3 | TX4 | TX5 | TX6 | TX7 | TX8 |
|---|---|---|---|---|---|---|---|---|
| RX1 | 53 | 150 | 22 | −1 | −3 | 0 | 4 | 10 |
| RX2 | 14 | 56 | 2 | −1 | 0 | 0 | 4 | −8 |
| RX3 | −17 | −11 | −8 | −1 | −5 | −1 | 3 | 12 |
| RX4 | −12 | −10 | −9 | 0 | 11 | −1 | −15 | −14 |
| RX5 | −34 | −13 | −8 | 0 | −7 | −1 | 4 | 2 |
| RX6 | −6 | −8 | −1 | −1 | 2 | −1 | −3 | −6 |

As seen from Table 8, the errors after the fitting coefficients are adjusted are much more lowered. Optionally, the fitting results upon this adjustment may be determined as the stable reference values. Nevertheless, further adjustment and correction may also be performed based on the fitting coefficients and the fitting results.

In another possible implementation, the capacitor node at the touch position may be positioned according to Table 5, then the data of the capacitor node at the touch position is removed from the channel of the capacitor, for example, the driving channel, and the remaining data is fitted. As listed in Table 5, if data 119 in the TX2 direction is the position of the capacitor node that is touched, the original reference value and the data at the same position of the capacitance value of the capacitor node on the touch screen in the current frame upon hopping are both removed, and the remaining data is fitted. In this case, the acquired fitting coefficients are as listed in Table 9.

TABLE 9

| Fitting coefficient | TX1 | TX2 | TX3 | TX4 | TX5 | TX6 | TX7 | TX8 |
|---|---|---|---|---|---|---|---|---|
| M | 2.846501 | 1.302018 | 0.567945 | 0.232433 | 0.885784 | 0.309806 | 0.894268 | −0.23287 |
| B | −5385.92 | −1076.73 | 969.0339 | 1882.479 | 113.9785 | 1665.972 | 78.09084 | 3222.315 |

The original reference values are fitted by using the adjusted fitting coefficients, and the acquired results are as listed in Table 10; then differences between the fitting results and the current capacitance reference, and the acquired difference data (the values in Table 2 are subtracted from the values in Table 10) is as listed in Table 11.

TABLE 10

| Serial number | TX1 | TX2 | TX3 | TX4 | TX5 | TX6 | TX7 | TX8 |
|---|---|---|---|---|---|---|---|---|
| RX1 | 2533 | 2551 | 2549 | 2529 | 2580 | 2528 | 2572 | 2574 |
| RX2 | 2544 | 2540 | 2549 | 2530 | 2582 | 2530 | 2576 | 2570 |
| RX3 | 2550 | 2546 | 2551 | 2528 | 2578 | 2527 | 2568 | 2574 |
| RX4 | 2561 | 2553 | 2554 | 2531 | 2590 | 2532 | 2584 | 2569 |
| RX5 | 2513 | 2529 | 2546 | 2528 | 2577 | 2527 | 2573 | 2572 |
| RX6 | 2575 | 2559 | 2507 | 2510 | 2509 | 2503 | 2500 | 2591 |

TABLE 11

| Serial number | TX1 | TX2 | TX3 | TX4 | TX5 | TX6 | TX7 | TX8 |
|---|---|---|---|---|---|---|---|---|
| RX1 | 53 | 150 | 22 | −1 | −3 | 0 | 4 | 10 |
| RX2 | 14 | 50 | 2 | −1 | 0 | 0 | 4 | −8 |
| RX3 | −17 | −14 | −8 | −1 | −5 | −1 | 3 | 12 |
| RX4 | −12 | −9 | −9 | 0 | 11 | −1 | −15 | −14 |
| RX5 | −34 | −26 | −8 | 0 | −7 | −1 | 4 | 2 |
| RX6 | −6 | −4 | −1 | −1 | 2 | −1 | −3 | −6 |

As seen from Table 11, the errors after the fitting coefficients are adjusted are much more lowered. Optionally, the fitting results upon this adjustment may be determined as the stable reference values. Nevertheless, further adjustment and correction may also be performed based on the fitting coefficients and the fitting results.

In still another possible implementation, the initially fitted differences (as listed in Table 5) are fitted again along the TX direction or the RX direction, for example, linear fitting or non-linear fitting again; and then the data acquired upon the further fitting is subtracted from the original fitting results.

For example, using the TX direction as a unit, the data listed in Table 5 is further fitted to acquire corresponding fitting results, for example, TX11 corresponding to TX1, TX21 corresponding to TX2, TX31 corresponding to TX3, . . . , and so on until TX81 corresponding to TX8; then the corresponding new fitting results are respectively subtracted from the data as listed in Table 5 to acquire corresponding results; using the channel TX2 as an example, the new fitting result is subtracted from the original fitting results of the capacitor nodes on the channel TX2 to respectively acquire 119-TX21, 34-TX21, -39-TX21, -43-TX21, -28-TX21 and -46-TX21; and hence, the data acquired upon subtraction may be determined as the stable reference values, which likewise may reduce the corresponding fitting errors.

Through the above operations, the stable reference value is closer to the actual capacitance reference. However, since the fitting error may not be absolutely eliminated, to better restore the actual capacitance reference, optionally, the stable reference value determined upon hopping may be further updated. For example, if it is detected that the difference between the determined stable reference value and the capacitance value of the capacitor node on the touch screen in the current frame is less than a predetermined threshold, the stable reference value is updated for the capacitor node in the corresponding region, for example, the stable reference value may be replaced by the capacitance value of the capacitor node on the touch screen in the current frame; and/or if it is detected that the finger moves away from (the capacitance values of all the capacitor nodes on the touch screen are continuously greater than or equal to a touch threshold) or is in contact with (there is at least one capacitor on the touch screen whose capacitance value is continuously greater than or equal to the touch threshold) the touch screen for a period of time (the finger is still on the touch screen) and then moves away from the touch screen, the stable reference value of the touch screen is updated and restored to a reference update in a normal state, that is, based on the stable reference value upon hopping that is used, after the finger moves away from the touch screen or the finger is in contact with the touch screen for a period of time, the current stable reference value is updated and restored to the reference update in the normal state. The normal state refers to a non-hopping state. Generally, once hopping occurs, the touch screen enters the hopping state, and a period of time later, the touch screen may restore to the non-hopping state, that is, the normal state. The reference update in the normal state may be performed in a customary update manner. Nevertheless, in a possible implementation, the reference update in which the touch screen restores to the normal state may also be practiced by updating the stable reference value according to a capacitance value of the capacitor node on the touch screen in a previous frame and a capacitance value thereof in a current frame, such that the update is more accurate. Specifically, with respect to each capacitor node on the touch screen, a capacitance value of the capacitor node on the touch screen in a previous frame and a capacitance value thereof in a current frame may be acquired; a difference between these two capacitance values is acquired; a product of the update coefficient and the difference is calculated based on a predetermined update coefficient; and a stable reference value corresponding to the capacitor node is updated according to the product and the capacitance value in the previous frame. The update coefficient may be any number within the range of 0.02 to 0.1.

In addition, since during long-term use, the touch screen may be subject to aging of the capacitor material and the like, and the aging may cause variations of the original reference of the capacitor node, to adapt to such variations, the original reference value needs to be adaptively learned (updated and backed up again). To prevent incorrect learning, a suitable learning environment may be established for the learning.

For example, during the learning process, the impacts caused by humidity need to be eliminated. Since in the practical testing, it is found that difference temperatures may exert some impacts on the frequency response, learning needs to be carried out at temperatures in the vicinity of the temperature for determining the original reference value. In addition, to prevent the noise from being learnt to the original reference value, learning needs to be carried out when the noise is low. In addition, learning of the original reference value may also employ a fitting manner that is similar to the above process of determining the stable reference value, wherein the capacitance value in the current frame at the same frequency is fitted by using the backup original reference value. In addition, learning needs to be carried out when the screen is not touched, and in this state, it is necessary to ensure that the touch screen is not touched by a finger, and the touch screen is in a relatively stable state.

Before learning, it is firstly detected whether the current working frequency of the touch screen is the same as the working frequency of the backup original reference value. If the frequencies are not the same, the working frequency of the touch screen needs to be switched to the frequency used for backing up the original reference value. With respect to data frames when the touch screen is just powered on, effective capacitance values may not be acquired because the circuit of the touch screen is not completely stable or due to data jittering. To prevent data jittering, in this embodiment, capacitance data of the capacitor node in the third frame is acquired (a person skilled in the art should acknowledge that the third frame is only for illustrative description, and in practice, a person skilled in the art would define the frame to be any suitable frame after the circuit of the touch screen becomes stable, which is not limited in the embodiment of the present disclosure). A difference is acquired between an average value of the acquired capacitance values and an average value of the original reference values. If the difference is less than a predetermined threshold, the temperature is not greatly varied, and considering the temperature variations, learning of the original reference value may be carried.

Under the condition of satisfying the temperature dimension, noise data at a frequency that is the same as the working frequency for acquiring and backing up the original reference value. If the noise data is greater, it is inappropriate to carry out learning of the original reference value; and if the noise data is smaller, the previous backup original reference value may be fitted to the acquired capacitance reference, and a difference between a fitting result and the capacitance value in the current frame is acquired. If the maximum difference is less than a predetermined threshold (this threshold may be appropriately defined by a person skilled in the art according to the touch threshold of the touch screen, for example, 3/5 to 2/5 or the like of the touch threshold, which is not limited in the embodiments of the present disclosure), the previous backup reference value is relatively correct, and no learning is needed; and if the maximum difference is not less than the predetermined threshold, learning may be carried out in the following manner.

For example, when the above condition is satisfied, the original reference value may be learned according to the following formula:

$$\text{Bakupnew}(i) = \text{Bakupold}(i) + (\text{helper}(i) - \text{helperfit}(i))/N$$

Bakupnew(i) represents an updated original reference, Bakupold(i) represents a previous backup original reference value, helper(i) represents a capacitance value of the capacitor node in the current frame at the same frequency as Bakupold(i), helperfit(i) represents a fitting result acquired after Bakupold(i) is fitted, N represents an update weight (which may be appropriately defined by a person skilled in the art according to the actual needs, for example, a weight of 16); and i represents the ith capacitor node.

Through the above process, the original reference value may be updated and corrected when the original reference value is not accurate due to such factors as aging of the capacitor material and the like.

In some occasions, the learnt original reference value needs to be written into a corresponding storage medium, for example, a FLASH. However, since the FLASH has a limited write count, the total write count shall not be greater than the maximum write count. If it is detected that the write count is greater than the maximum write count, the learnt original reference values may fail to be written into the FLASH. Nevertheless, before learning of the original reference value, a person skilled in the art may also firstly judge whether the write count of the FLASH has exceeded the maximum write count, the learning of the original reference value may not be carried out if the write count has exceeded the maximum write count.

With the touch screen reference determining solution according to this embodiment, a relatively correct reference may be established when the touch screen hops, and it is ensured that the touch screen operates normally, without random false positives or non-response of touch screen. A stable reference value upon hopping is established by means of fitting, which effectively references the capacitance values of a plurality of capacitor nodes such that the determined stable reference value is more subjective and accurate. An acquired candidate reference value is corrected by means of fitting, which further ensures accuracy of the stable reference value. Learning in which the original reference value varies with the capacitance value of the capacitor node is employed with respect to aging of the capacitor material during long-term use of the capacitor, which effectively solves the problem of acquiring an accurate stable reference value. The stable reference value upon hopping is further updated during the subsequent use, which further improves accuracy of the stable reference value such that the stable reference value is closer to an actual capacitance reference.

The touch screen reference determining method according to this embodiment may be practiced by any suitable apparatus or device having a data processing function, including, but not limited to, a touch controller.

Figure 4:
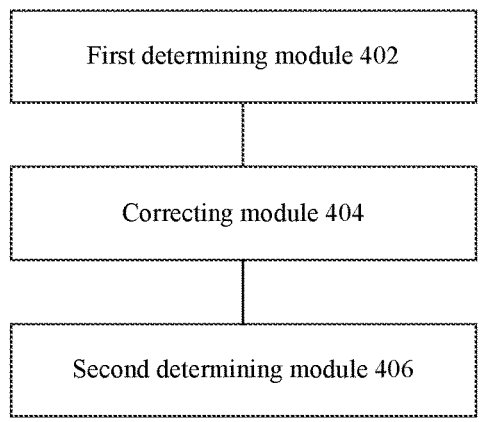
FIG. 4 is a schematic structural block diagram of a touch screen reference determining apparatus according to the fourth embodiment of the present disclosure.

FIG. 4 is a schematic structural block diagram of a touch screen reference determining apparatus according to the fourth embodiment of the present disclosure.

The touch screen reference determining apparatus according to this embodiment includes: a first determining module 402, configured to determine a candidate reference value of a touch screen according to an original reference value and a reference fitting relationship of the touch screen, wherein the reference fitting relationship is determined according to the original reference value of the touch screen and a capacitance value of a capacitor node on the touch screen in a first frame; a correcting module 404, configured to correct the candidate reference value; and a second determining module 406, configured to determine a stable reference value of the touch screen according to the corrected candidate reference value.

With the touch screen reference determining apparatus according to this embodiment, an original reference value is firstly processed by means of fitting to acquire a candidate reference value of the touch screen. However, the candidate reference value may be not accurate, and thus needs to be further corrected to acquire a final correct and stable reference value of the touch screen. In the manner of acquiring the candidate reference value of the touch screen by means of fitting, when the reference of each capacitor node is determined, not only data of the capacitor node is considered, but also data of the other capacitor nodes is used as a reference, such that the determined candidate reference is more subject and is closer to a current actual capacitance reference. Further, the acquired candidate reference value may be further corrected, to ensure that during the process of acquiring the stable reference value, even if some exceptions occur, for example, a finger touches the touch screen, through correction, the candidate reference value is closer to the actual capacitance reference, such that accuracy of the determined stable reference value is ensured as much as possible.

Figure 5:
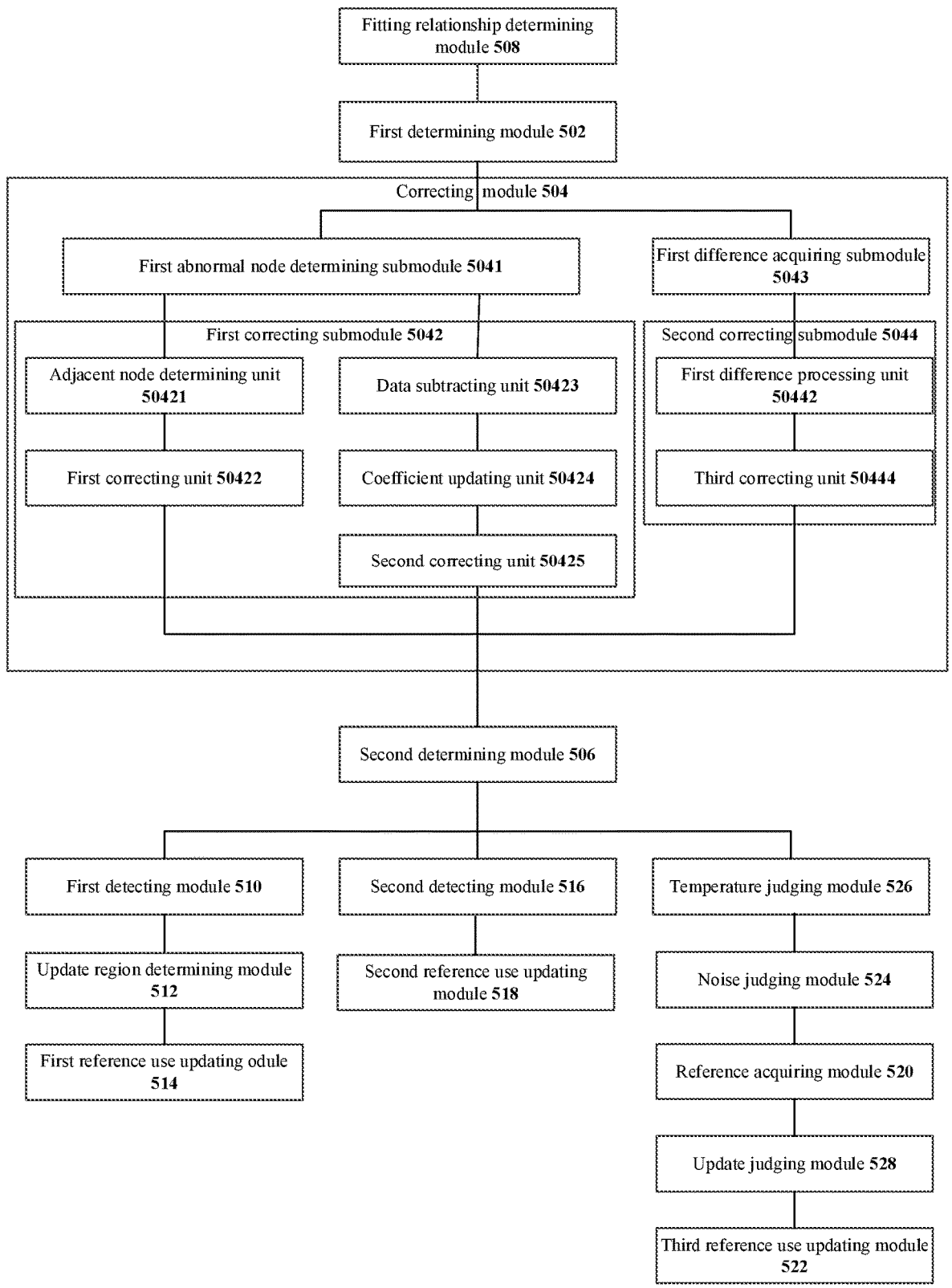
FIG. 5 is a schematic structural block diagram of a touch screen reference determining apparatus according to the fifth embodiment of the present disclosure.

FIG. 5 is a schematic structural block diagram of a touch screen reference determining apparatus according to the fifth embodiment of the present disclosure.

The touch screen reference determining apparatus according to this embodiment includes: a first determining module 502, configured to determine a candidate reference value of a touch screen according to an original reference value and a reference fitting relationship of the touch screen, wherein the reference fitting relationship is determined according to the original reference value of the touch screen and a capacitance value of a capacitor node on the touch screen in a first frame; a correcting module 504, configured to correct the candidate reference value; and a second determining module 506, configured to determine a stable reference value of the touch screen according to the corrected candidate reference value.

Optionally, a precondition for executing the first determining module 502 is: it is identified that a frequency of a driving signal of the touch screen has changed.

Optionally, the correcting module 504 includes: a first abnormal node determining submodule 5041, configured to determine a capacitor node with an abnormal reference value according to a difference between the candidate reference value and the original reference value; and a first correcting submodule 5042, configured to correct a candidate reference value of the capacitor node with the abnormal reference value.

Optionally, the first correcting submodule 5042 includes: an adjacent node determining unit 50421, configured to determine a capacitor node that is adjacent to the capacitor node with the abnormal reference value; and a first correcting unit 50422, configured to correct the candidate reference value of the capacitor node with the abnormal reference value according to a corresponding original reference value of the capacitor node with the abnormal reference value, a fitting coefficient of the adjacent capacitor nodes and the reference fitting relationship.

Optionally, the first correcting unit 50422 determines the fitting coefficient of the adjacent capacitor nodes by: determining a capacitor nodes with a minimum difference between the candidate reference and a capacitance in a second frame from a plurality of adjacent capacitor nodes of the capacitor nodes with the abnormal reference value; and determining a fitting coefficient of the capacitor node with the minimum difference as the fitting coefficient for correcting the candidate reference value corresponding to the capacitor node with the abnormal reference value.

Optionally, the first correcting submodule 5042 includes: a data subtracting unit 50423, configured to subtract a value corresponding to the capacitor node with the abnormal reference value from the original reference value of the touch screen to acquire a corrected original value, and subtract a capacitance value corresponding to the capacitor node with the abnormal reference value from a capacitance of the capacitor node on the touch screen in a third frame to acquire a corrected capacitance value; a coefficient updating unit 50424, configured to update a fitting coefficient in the reference fitting relationship according to the corrected original value and the corrected capacitance value; and a second correcting unit 50425, configured to correct the candidate reference value according to the updated fitting coefficient and the original reference value.

Optionally, the second correcting unit 50425 is configured to correct the candidate reference value according to the original reference value, the reference fitting relationship and the updated fitting coefficient.

Optionally, the correcting module 504 includes: a first difference acquiring submodule 5043, configured to acquire a difference between the candidate reference value of the capacitor of the touch screen and a capacitance value in a fourth frame; and a second correcting submodule 5044, configured to correct the candidate reference value according to the difference and the reference fitting relationship.

Optionally, the second correcting submodule 5044 includes: a first difference processing unit 50442, configured to fit the difference according to the reference fitting relationship to acquire a difference fitting result; and a third correcting unit 50444, configured to correct the candidate reference value according to a difference between the candidate reference value and the difference fitting result.

Optionally, the first difference processing unit 50442 is configured to fit the difference using a driving channel of the touch screen as a unit or using a sensing channel of the touch screen as a unit according to the reference fitting relationship, to acquire a difference fitting result.

Optionally, the touch screen reference determining apparatus according to this embodiment further includes: a fitting relationship determining module 508, configured to: prior to the determining a candidate reference value of a touch screen by the first determining module 502 according to an original reference value and a reference fitting relationship of the touch screen, fit the original reference value of the touch screen and a capacitance value of the capacitor node on the touch screen in a fifth frame by using a plurality of different fitting relationships, to acquire a plurality of corresponding fitting results; determine a fitting result with a minimum fitting error from the plurality of fitting results; and determine a fitting relationship corresponding to the fitting result with the minimum fitting error as the reference fitting relationship for acquiring the candidate reference value.

Optionally, the touch screen reference determining apparatus according to this embodiment further includes: a first detecting module 510, configured to, upon the determining a stable reference value of the touch screen by the second determining module 506 according to the corrected candidate reference value, identify a capacitor node with a difference between the stable reference value and a capacitance value in a sixth frame being less than a predetermined threshold on the touch screen; and an update region determining module 512, configured to determine a reference update region based on the identified capacitor node; and a first reference use updating module 514, configured to update a stable reference value for the capacitor nodes in the reference update region.

Optionally, first reference use updating module 514 is configured to update the stable reference value according to a capacitance value of the capacitor node in the reference update region in a current frame.

Optionally, the touch screen reference determining apparatus according to this embodiment further includes: a second detecting module 516, configured to, upon the determining a stable reference value of the touch screen by the second determining module 506 according to the corrected candidate reference value, identify a capacitor node on the touch screen with a capacitance value that is continuously greater than or equal to a touch threshold during a period of time that is longer than a first predetermined time threshold, or identify that capacitance values of all capacitor nodes on the touch screen are continuously less than the touch threshold during a period of time that is longer than a second predetermined time threshold; and a second reference use updating module 518, configured to update the stable reference value according to capacitance values of the capacitor node on the touch screen in a seventh frame and an eighth frame.

Optionally, the second reference use updating module 518 is configured to acquire a difference between the capacitance values of the capacitor node on the touch screen in the seventh frame and the eighth frame, calculate a product of a defined update coefficient and the difference, and update the stable reference value according to a sum of the product and the capacitance value in the seventh frame.

Optionally, the touch screen reference determining apparatus according to this embodiment further includes: a reference acquiring module 520, configured to, upon the determining a stable reference value of the touch screen by the second determining module 506 according to the corrected candidate reference value, acquire a capacitance value and a fitting reference value of the capacitor node on the touch screen in a ninth frame at a predetermined driving signal frequency, wherein the predetermined driving signal frequency is a frequency for generating the original reference value, and the fitting reference value is acquired according to the reference fitting relationship and the original reference value; and a third reference use updating module 522, configured to update the original reference value according to the acquired capacitance value and fitting reference value.

Optionally, the third reference use updating module 522 is configured to acquire a difference between the capacitance value and the fitting reference value, and update the original reference value according to a product of a predetermined weight and the acquired difference.

Optionally, the touch screen reference determining apparatus according to this embodiment further includes: a noise judging module 524, configured to, prior to the acquiring a capacitance value and a fitting reference value of the capacitor node on the touch screen in a ninth frame at a predetermined driving signal frequency by the reference acquiring module 520, acquire noise data of the touch screen at the predetermined driving signal frequency, judge whether the noise data is less than a predetermined noise threshold, and execute the reference acquiring module 520 if the noise data is less than the predetermined noise threshold.

Optionally, the touch screen reference determining apparatus according to this embodiment further includes: a temperature judging module 526, configured to, prior to the acquiring noise data of the touch screen at the predetermined driving signal frequency by the noise judging module 524, judge whether a difference between an average value of the acquired capacitance values and an average value of the original reference values is less than a predetermined average difference threshold, and execute the noise judging module 524 if the difference between the average value of the acquired capacitance values and the average value of the original reference values is less than the predetermined average difference threshold.

Optionally, the touch screen reference determining apparatus according to this embodiment further includes: an update judging module 528, configured to the updating the original reference value according to the acquired capacitance value and fitting reference value by the third reference use updating module 522, judge whether a difference between the capacitance value and the fitting reference value is greater than a predetermined difference threshold, and execute the third reference use updating module 522 if the difference between the capacitance value and the fitting reference value is greater than the predetermined difference threshold.

The touch screen reference determining apparatus according to this embodiment is configured to perform the corresponding touch screen reference determining methods in the above method embodiments, and achieves the beneficial effects corresponding to the method embodiments, which are thus not described herein any further.

Figure 6:
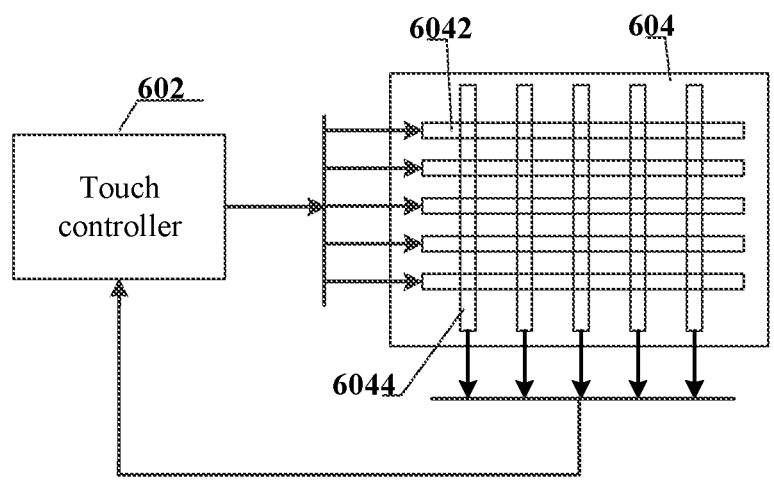
FIG. 6 is a schematic structural diagram of a touch screen according to the sixth embodiment of the present disclosure.

FIG. 6 is a schematic structural diagram of a touch screen according to the sixth embodiment of the present disclosure.

The touch screen according to this embodiment includes a touch controller 602 and a touch sensor 604. The touch controller 602 is electrically connected to the touch sensor 604. Wherein, the touch sensor 604 includes a plurality of driving electrodes 6042 and a plurality of sensing electrodes 6043 that are arranged to be perpendicular to the plurality of driving electrodes 6042. The driving electrodes 6042 are transversely arranged, and the sensing electrodes 6044 are longitudinally arranged. Capacitor nodes are formed at intersections of the driving electrodes 6042 and the sensing electrodes 6044.

The touch controller 602 inputs a driving signal at a predetermined frequency to the driving electrodes 6042 based on a specific driving manner, and the driving signals is transmitted through a capacitive sensor, then formed into a sensing signal by the sensing electrodes 6044 and finally returned to the touch controller 602. The touch controller 602 converts the sensing signal into a digital signal via an analog-to-digital converter (ADC) and the like circuit configured therein, parses the digital signal and thus acquires a capacitance value corresponding to each capacitor node.

In this embodiment, the touch sensor 604 acquires a capacitance value of a capacitor on the touch screen; the touch controller acquires the capacitance value acquired by the touch sensor 604 performs operations corresponding to any of the touch screen reference determining methods as described in the first embodiment to the third embodiment according to the acquired capacitance value.

For example, when the touch controller 602 pre-determines a reference fitting relationship according to the capacitance value (or referred to as current detection data) acquired by the touch sensor 604 and a stored original reference value, and determines a candidate reference value of the touch screen according to the original reference value of the touch screen and the reference fitting relationship. As such, the touch controller 602 corrects the candidate reference value, and the touch controller 602 determines a stable reference value according to a corrected result.

With the touch screen according to this embodiment, in the manner of acquiring the candidate reference value of the touch screen by means of fitting, when the reference of each capacitor node is determined, not only data of the capacitor node is considered, but also data of the other capacitor nodes is used as a reference, such that the determined candidate reference is more subject and is closer to a current actual capacitance reference. Further, the acquired candidate reference value may be further corrected, to ensure that during the process of acquiring the stable reference value, even if some exceptions occur, for example, a finger touches the touch screen, through correction, the candidate reference value is closer to the actual capacitance reference, such that accuracy of the determined stable reference value is ensured as much as possible.

An embodiment of the present disclosure further provides an electronic terminal. The electronic terminal includes the touch screen as described in the above embodiment.

The above described device embodiments are merely for illustration purpose only. The modules which are described as separate components may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments. Persons of ordinary skill in the art may understand and implement the present disclosure without paying any creative effort.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a computer readable storage medium. The computer-readable storage medium includes any mechanism for storing or transferring information in a computer readable form. For example, the computer-readable medium includes a read-only memory (ROM), a random access memory (RAM), a disk storage medium, an optical storage medium, a flash storage medium, electricity, light, sound and other forms of propagation signals (for example, a carrier, an infrared signal, a digital signal and the like), and the like. The computer software product includes several instructions for instructing a computer device (which may be a personal computer, a server, or a network device) to perform all the embodiments or some parts of the embodiments.

Finally, it should be noted that the above embodiments are merely intended to describe the technical solutions of the embodiments of the present disclosure, instead of limiting the present disclosure. Although the present disclosure is described in detail with reference to the above embodiments, persons of ordinary skill in the art should understand that various modifications may be made to the technical solutions described in the above embodiments or equivalent replacements may be made to some technical features thereof, without departing from the spirit and scope of the technical solutions of the embodiments of the present disclosure.

What is claimed is:

1. A method for determining a reference value of a capacitor node of a capacitive touch screen, comprising:
   determining a candidate reference value of the capacitor node based on an original reference value and a reference fitting function of the capacitor node, wherein the reference fitting function is constructed based on the original reference value and a capacitance value of the capacitor node in a first frame;
   correcting the candidate reference value; and
   determining a stable reference value based on the corrected candidate reference value, the stable reference being used as the reference value of the capacitor node for detecting touch position on the touch screen,
   wherein the of correcting the candidate reference value comprises:
      identifying the capacitor node as an abnormal capacitor node with an abnormal reference value based on a difference between the candidate reference value and the original reference value of the capacitor node; and
      correcting the candidate reference value of the abnormal capacitor node with the abnormal reference value,
   wherein the correcting the candidate reference value of the abnormal capacitor node with the abnormal reference value further comprises:
      (i) determining a second capacitor node of the touch screen that is adjacent to the abnormal capacitor node with the abnormal reference value; and correcting the candidate reference value of the abnormal capacitor node with the abnormal reference value based on the original reference value of the abnormal capacitor node with the abnormal reference value, a fitting coefficient and the reference fitting function of the second capacitor node; or
      (ii) removing the original reference value of the abnormal capacitor node with the abnormal reference value from a first set of original reference values of capacitor nodes of the touch screen to form a second set of corrected original values, and removing a capacitance value of the abnormal capacitor node with the abnormal reference value from a third set of capacitance values of the capacitor nodes of the touch screen in a third frame to form a fourth set of corrected capacitance values; updating a fitting coefficient of the reference fitting function based on the second set of corrected original values and the fourth set of corrected capacitance values; and correcting the candidate reference value of the abnormal capacitor node with the abnormal reference value based on the reference fitting function with the fitting coefficient updated and the original reference value of the abnormal capacitor node with the abnormal reference value.

2. The method according to claim 1, wherein the fitting coefficient of the second capacitor node is determined by:
   determining a second capacitor node with a minimum difference between the candidate reference and a capacitance in a second frame from a plurality of adjacent capacitor nodes of the abnormal capacitor nodes with the abnormal reference value; and
   determining the fitting coefficient of the second capacitor node with the minimum difference as the fitting coefficient for correcting the candidate reference value corresponding to the abnormal capacitor node with the abnormal reference value.

3. The method according to claim 1, wherein prior to the step of determining a candidate reference value of the capacitor node based on an original reference value and a reference fitting function of the capacitor node, the method further comprises:
   fitting the original reference value of the capacitor node and a capacitance value of the capacitor node in a fifth frame by using a plurality of different fitting functions, to obtain a plurality of corresponding fitting results;
   determining a fitting result with a minimum fitting error from the plurality of fitting results; and
   determining a fitting function corresponding to the fitting result with the minimum fitting error as the reference fitting function of the capacitor node for obtaining the candidate reference value of the capacitor node.

4. The method according to claim 1, wherein upon the step of determining a stable reference value based on the corrected candidate reference value, the method further comprises:
   identifying a capacitor node on the touch screen with a difference between the stable reference value and a capacitance value in a sixth frame being less than a predetermined threshold;
   determining a reference update region based on the identified capacitor node; and
   updating a stable reference value for capacitor nodes in the reference update region.

5. The method according to claim 1, wherein upon the step of determining a stable reference value based on the corrected candidate reference value, the method further comprises:
   identifying a capacitor node on the touch screen with a capacitance value that is continuously greater than or equal to a touch threshold during a period of time that is longer than a first predetermined time threshold; or identifying that capacitance values of all capacitor nodes on the touch screen are continuously less than the touch threshold during a period of time that is longer than a second predetermined time threshold; and
   updating the stable reference value based on capacitance values of the capacitor nodes on the touch screen in a seventh frame and an eighth frame.

6. The method according to claim 1, wherein upon the step of determining a stable reference value based on the corrected candidate reference value, the method further comprises:
   acquiring a capacitance value and a fitting reference value of the capacitor node on the touch screen in a ninth frame at a predetermined driving signal frequency, wherein the predetermined driving signal frequency is a frequency for generating the original reference value, and the fitting reference value is acquired based on the reference fitting function and the original reference value of the capacitor node; and
   updating the original reference value based on the acquired capacitance value and fitting reference value of the capacitor node.

7. The method according to claim 6, wherein the step of updating the original reference value based on the acquired capacitance value and fitting reference value comprises:
   acquiring a difference between the capacitance value and the fitting reference value; and
   updating the original reference value based on a product of a predetermined weight and the acquired difference.

8. The method according to claim 6, wherein prior to the step of acquiring a capacitance value and a fitting reference value of the capacitor node on the touch screen in a ninth frame at a predetermined driving signal frequency, the method further comprises:
   acquiring noise data of the touch screen at the predetermined driving signal frequency;
   judging whether the noise data is less than a predetermined noise threshold; and
   performing the step of acquiring a capacitance value and a fitting reference value of the capacitor node on the touch screen in a ninth frame at a predetermined driving signal frequency if the noise data is less than the predetermined noise threshold.

9. The method according to claim 6, wherein prior to the step of updating the original reference value based on the acquired capacitance value and fitting reference value, the method further comprises:
   judging whether a difference between the capacitance value and the fitting reference value is greater than a predetermined difference threshold; and
   performing the step of updating the original reference value based on the acquired capacitance value and fitting reference value if the difference between the capacitance value and the fitting reference value is greater than the predetermined difference threshold.

10. An electronic terminal, comprising a capacitive touch screen, the touch screen comprising a touch controller and a touch sensor, the touch controller being electrically connected to the touch sensor; wherein
   the touch sensor is configured to acquire a capacitance value of a capacitor node on the touch screen;
   the touch controller is configured to acquire the capacitance value acquired by the touch sensor and perform the operations of:
      determining a candidate reference value of the capacitor node based on an original reference value and a reference fitting function of the capacitor node, wherein the reference fitting function is constructed based on the original reference value and a capacitance value of the capacitor node in a first frame;
      correcting the candidate reference value; and
      determining a stable reference value according to the corrected candidate reference value, the stable reference being used as the reference value of the capacitor node for detecting touch position on the touch screen, wherein the correcting the candidate reference value comprises:

acquiring a difference between the candidate reference value of the capacitor node and a capacitance value of the capacitor node in a fourth frame; and correcting the candidate reference value based on the difference and the reference fitting function, wherein the correcting the candidate reference value based on the difference and the reference fitting function comprises: fitting the difference based on the reference fitting function to acquire a difference fitting result of the difference; and correcting the candidate reference value based on a difference between the candidate reference value and the different fitting result.

11. A method for determining a reference value of a capacitor node of a capacitive touch screen, comprising:

determining a candidate reference value of the capacitor node based on an original reference value and a reference fitting function of the capacitor node, wherein the reference fitting function is constructed based on the original reference value and a capacitance value of the capacitor node in a first frame;

correcting the candidate reference value; and determining a stable reference value based on the corrected candidate reference value, the stable reference being used as the reference value of the capacitor node for detecting touch position on the touch screen, wherein the correcting the candidate reference value comprises:

acquiring a difference between the candidate reference value of the capacitor node and a capacitance value of the capacitor node in a fourth frame; and correcting the candidate reference value based on the difference and the reference fitting function, wherein the correcting the candidate reference value based on the difference and the reference fitting function comprises: fitting the difference based on the reference fitting function to acquire a difference fitting result of the difference; and correcting the candidate reference value based on a difference between the candidate reference value and the different fitting result.

* * * * *